Oct. 15, 1940.  W. C. LAUGHLIN  2,218,355
DEEP OR BOTTOM CLEANER FOR FILTER BEDS
Filed July 18, 1939
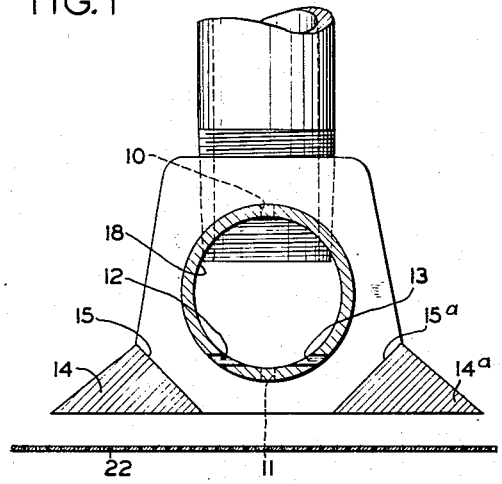
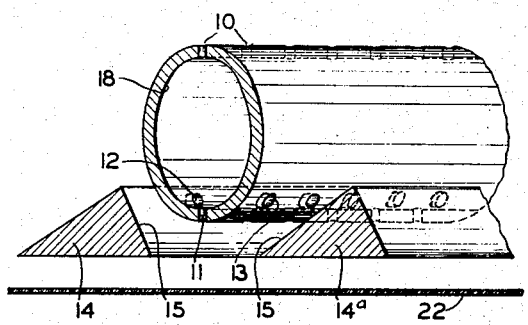
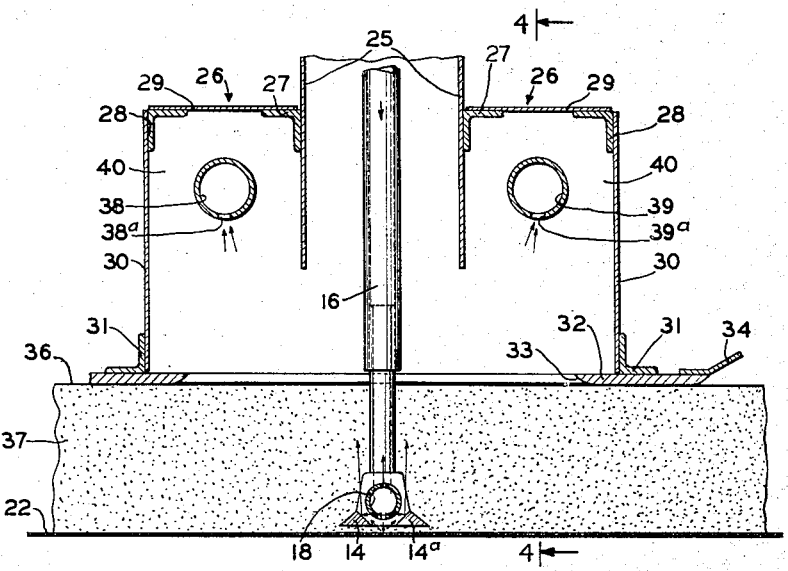
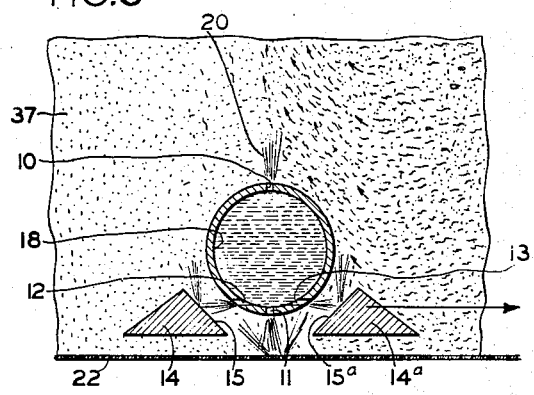
INVENTOR.
WILLIAM C. LAUGHLIN
ATTORNEY.

Patented Oct. 15, 1940

2,218,355

UNITED STATES PATENT OFFICE 2,218,355

DEEP OR BOTTOM CLEANER FOR FILTER BEDS

William C. Laughlin, New York, N. Y., assignor to W. C. Laughlin Corporation, New York, N. Y., a corporation of New York Application July 18, 1939, Serial No. 285,078

4 Claims. (Cl. 210—128)

This invention relates to deep or bottom cleaners for filter beds having a screen with filter bed material thereon, and the object of the invention is to provide an improved deep cleaner or bottom cleaner so as to subject the lower part of the filter bed to an agitation resulting from the injection into the filter bed of water under pressure, or water and air under pressure, to thereby lessen the impurities and separate the impurities from the material forming the filter bed.

The object is further to confine the water resulting from churning up the entire filter bed to localized places where the deep cleaner operates, within certain confines so as to be able to readily draw off the water containing the impurities.

For this purpose, the improved deep cleaner consists of a plow and a horizontally disposed pipe with spaced openings therein arranged parallel with the plow, the pipe being supplied with cleaning water under pressure with or without air, and the water, as it is projected through the openings of said pipe and impinged either against the screen or against the walls of the plow, causing the water of the filter bed to be agitated as well as to bring about the agitation of the material composing the filter bed. Certain of the openings in the pipe are directed upwardly, so as to induce the water, with the entrained impurities, to move upwardly and away from the pipe and the plow. In order to confine the water containing the impurities within a sphere of action of the deep cleaner pipe and plow, a hood provided with sleds, which sleds ride upon the top surface of the filter bed, is provided. Within the hood a draw off pipe of the water with the impurities within the hood, is provided to thereby draw off the waste water and discharge it away from the filter. In the preferred form, the plow is duplicated so as to have one in advance of the distributing pipe, and one rearwardly thereof, depending upon the direction of movement of the pipe, and likewise the hood just described is preferably duplicated so as to have one draw off pipe within each hood.

The structure embodying the invention just set forth is simple in construction and in operation, and is very efficient in the cleaning of the filter bed material and separating it from the accumulated impurities.

As is known, a deep cleaner of this kind is used periodically in a filter bed, and while it is disposed transversely of the filter bed, it is moved longitudinally of the filter bed.

As it is only necessary to clean the filter bed itself at stated intervals, the deep cleaner embodying the invention just described is periodically moved through the filter bed at spaced intervals.

The invention will be more fully described hereinafter, embodiments thereof will be shown in the drawing, and the invention itself will be finally pointed out in the claims.

In the accompanying drawing:

Figure 1 is a vertical transverse section of a bottom of the filter bed cleaner;

Figure 2 is a partial perspective view thereof;

Figure 3 is a vertical transverse section in the same direction as taken in Figure 1, but showing the relationship of the part shown in Figure 1 to the other parts of the bottom filter cleaner or deep cleaner;

Figure 4 is a front view of the cleaning water distributing pipe; and

Figure 5 is a diagrammatic drawing of the cleaning pipe in relation to the plow and in relation to the screen of the filter bed.

Similar characters of reference indicate corresponding parts throughout the various views.

The pipe 18 shown in all the figures of the drawing is provided with two diametrically opposite openings 10 and 11 along the vertical diameter of the pipe 18. This pipe 18 is also provided with two horizontal openings 12 and 13, closely adjacent the lower vertical opening 11. The plows 14 and 14a have straight walls 15 and 15a facing the pipe and spaced therefrom. The water is pumped into the supply pipes 16 and 17, and is thereby distributed horizontally along the horizontal pipe 18 and through its vertical openings 10, the cleaning water thereby forcing streams 20 perpendicularly upwardly. At the same time, the oppositely disposed opening 11 causes the cleaning water to be forced perpendicularly downwardly and in the direction towards and against the filter screen 22 at angles of impact deflected angularly towards and through the space between the exterior of the pipe 18 and the straight walls 15 and 15a.

The cleaning water forced through the horizontal openings 12 and 13 impinges against the straight walls 15 and 15a, and due to their angularity is deflected upwardly. The combined action of these streams projected by the openings 10, 11, 12 and 13 brings about first a churning action of the material of the filter bed close to the screen 22, mainly by virtue of the action of the downward stream projected through the opening 11, and these streams are deflected by the screen and a certain amount of the material is carried along therewith, but mainly the dirt and impurities are moved upwardly at such inclined angles in the space between the pipe 18 and the walls 15 and 15a. This upwardly moving material is again subjected to and impinged by the streams projected through the horizontal openings 12 and 13, and these streams, striking the inclined surfaces 15 and 15a, are also deflected upwardly. The upwardly directed stream 20 of the opening 10 is mainly for the purpose of giving the general mass of water an upward movement so as to carry therewith the dirt or impurities which have separated from the filter bed material due to the churning action described. Due to the gravity action upon the filter bed material, it gradually descends, but in cleaned condition.

The pipes 16 and 17 which are connected with the horizontal distributing pipe 18 are connected in turn at their upper ends with a pump which is not shown, and this pump forces clean cleaning water into the pipes 16 and 17 downwardly, so that the same is distributed through the openings 10, 11, 12 and 13 of the pipe 18 as described. The pipes 16 and 17 pass upwardly through a funnel portion 25 of a hood 26 which is formed by oppositely disposed angle irons 27 and 28 to which a top plate 29 is secured as also a side plate 30. The lower end of the side plate 30 has an angle iron 31 to which a bottom plate 32 is secured. The bottom plate 32 has a curved portion inwardly thereof as indicated by 33, and has an upwardly extending portion 34 with an exterior curved surface so that the bottom plate 32 with its curved surfaces 33 and 34 acts in the nature of a sled which rides upon the top surface layer 36 of the filter bed 37 which rests upon the screen 22. The hood 26 just described as being on one side of the funnel 25 is reproduced in counterpart at the other side of the funnel 25. Equidistantly disposed from the walls of the hood 26, and within the same, are draw off or outlet pipes 38 and 39 having openings 38a and 39a at the lowermost sides.

The interiors of the hoods 26 are filled entirely with water and impurities, which impurities were separated from the material forming the filter bed 37. The pipes 38 and 39 are connected with suction pumps not shown, which suck out this waste water with impurities and discharge it away from the filter. The hoods 26 function to collect that part of the water of the filter which has the separated impurities therein, which impurities were separated by the action described in connection with Figure 5, and this waste water with such impurities is drawn off by means of the pump of the suction pipes 38 and 39. The walls of the funnel 25 extend beyond the level of the water of the filter. The hoods 26 have end walls, one of which is indicated by 40, and these end walls are disposed about in line with the longitudinal margins of the filter bed. It will be clear that the structure shown in Figure 3 with its hoods running transversely of the filter bed, extend from one marginal portion of the filter bed to the other transversely of the same, but this filter bed cleaner moves longitudinally of the filter bed. As is known, this movement is periodic. In the case of a top surface cleaner, the movement is continuously to and fro, whereas with a deep surface or bottom cleaner, it is only necessary to subject the body of the filter material to a cleaning from time to time.

From the foregoing, it will have been seen that the distributing pipe for the fresh or cleaning water is provided with only a few openings which have a special and limited function, namely, the two diametrically opposite disposed openings for projecting water upwardly and downwardly, and the two horizontal openings for cooperating with the inclined surfaces of the plows 14 and 14a so as to thoroughly clean any grains of the filter bed material of the impurities, and that the sphere of action of this cleaning water distributing pipe is enclosed by the hoods in which the draw off pipes are arranged.

The pipes 38 and 39 may be supported in any suitable way. In the embodiment, they pass through the walls 40 and 40a, and exterior of these walls the pipes 38 and 39 are connected with suitable other pipes leading to the suction pump not shown.

From the foregoing it will have been seen that the entire body of the filter bed in contrast to the top surface thereof, is subjected to a thorough cleaning by the means described.

I have described an embodiment of my improved deep or bottom cleaner, but it is clear that changes may be made within the principle of the invention described, without departing from the scope of the subjoined claims.

I claim:

1. In a deep or bottom cleaner for filter beds having a screen and superimposed filter bed material thereon, a horizontally disposed cleaning water distributing pipe adapted to be moved longitudinally along the filter bed, said horizontally disposed pipe being adjacent the screen of the filter bed and having openings along the length of said pipe, and a bar parallel with said pipe and having a surface adjacent and facing said openings, said surface being inclined upwardly and away from said pipe to receive jets from the openings of said pipe and direct them upwardly, and having two surfaces converging to an apex directed away from said first angular surface.

2. In a deep or bottom cleaner for filter beds having a screen and superimposed filter bed material thereon, a horizontally disposed cleaning water distributing pipe adapted to be moved longitudinally along the filter bed, said horizontally disposed pipe being adjacent the screen of the filter bed and having openings along the length of said pipe, a bar parallel with said pipe and having a surface adjacent and facing said opening, said surface being inclined upwardly and away from said pipe to receive jets from the openings of said pipe and direct them upwardly, and having two surfaces converging to an apex directed away from said first angular surface, a hood above and enclosing said pipe and bar to gather fluid and its impurities and means for removing from the hood the therein enclosed fluid with impurities and discharging the same outside of the filter.

3. In a deep or bottom cleaner for filter beds having a screen and superimposed filter bed material thereon, a horizontally disposed cleaning water distributing pipe adapted to be moved longitudinally along the filter bed while extending transversely of the filter bed, said horizontally disposed pipe being adjacent the screen of the filter bed and having two vertically disposed openings along the vertical diameter of said pipe and horizontally directed openings closely adjacent the lowermost vertically disposed openings, and a bar spaced away from the pipe and having an inclined surface adjacent and facing said horizontal openings, said inclined surface receiving the water projected from said horizontally directed openings and directing the water upwardly, said inclined surface being spaced from the exterior of the pipe to allow any impurities loosened or separated from the filter bed below the pipe to pass between the exterior of the pipe and the inclined surface, said bar having a second surface inclined to the first surface away from said pipe and forming with the first surface an apex, said second surface acting to move filter material over the apex to be acted upon by the water from the horizontal openings when the cleaner material is moved through the filter material with the second surface leading.

4. In a deep or bottom cleaner for filter beds having a screen and filter bed material thereon, a horizontally disposed pipe having openings therein, two openings one above the other and along the vertical diameter thereof, and two other openings horizontally directed and close to the lowermost vertical openings, a plow for each side of the horizontal pipe and having a surface adjacent and facing said openings, said surface being inclined upwardly and away from said pipe and spaced therefrom to receive the water projected from said horizontally directed openings and direct same upwardly, each of said plows having a pointed part opposed to said inclined surface formed of two annular surfaces, a hood disposed above the horizontal pipe to collect the water containing the impurities within the hood and exhaust pipes within the hood to remove the water within the hood having impurities therein and discharge said water with impurities exterior to the hood, said hood having sled portions adapted to ride upon the top surface of the filter bed.

WILLIAM C. LAUGHLIN.